May 5, 1936.  C. KELSAY  2,040,004

KITCHEN UTENSIL

Filed Dec. 7, 1934  2 Sheets-Sheet 1

Inventor
Carrie Kelsay
By Clarence A. O'Brien
Attorney

May 5, 1936.  C. KELSAY  2,040,004

KITCHEN UTENSIL

Filed Dec. 7, 1934  2 Sheets-Sheet 2

Inventor
Carrie Kelsay

By Clarence A. O'Brien
Attorney

Patented May 5, 1936

2,040,004

UNITED STATES PATENT OFFICE 2,040,004

KITCHEN UTENSIL

Carrie Kelsay, Columbia, Ky.

Application December 7, 1934, Serial No. 756,522

1 Claim. (Cl. 53—2)

This invention relates to improvements in cooking utensils, and the primary object of the invention is the provision of a utensil embodying a novel assortment of receptacles which may be arranged and used collectively or individually for various purposes, such as a dish pan, dish drainer, roaster, kettle, canner, double boiler, bread or cake box, colander, steam cooker and for sundry other purposes as will appear to those skilled in the art.

The invention together with its objects and advantages will be best understood from a study of the following description taken in connection with the accompanying drawings wherein.

Figure 1:
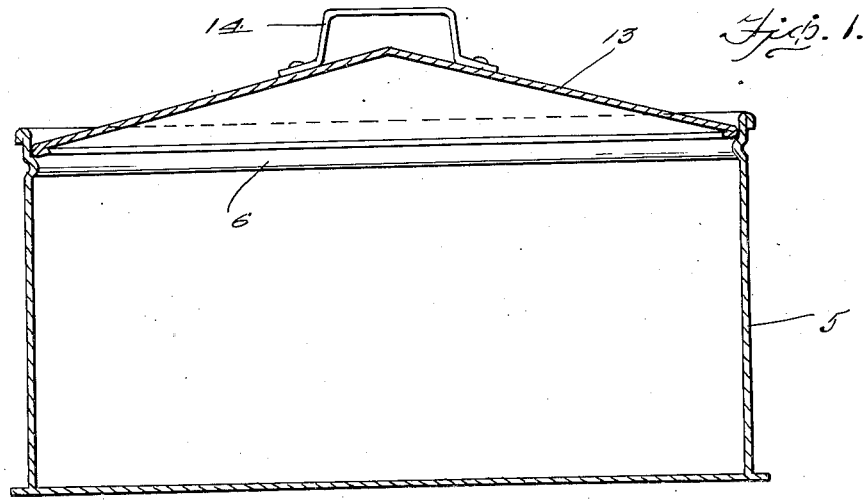
Figure 1 is a sectional view showing a receptacle and lid forming part of the invention.

Referring to the drawings by reference numerals it will be seen that the utensil comprises a receptacle 5 of metal or other suitable material which is water tight and which adjacent its upper edge has the wall thereof pressed inwardly to provide an internal bead 6.

Figure 2:
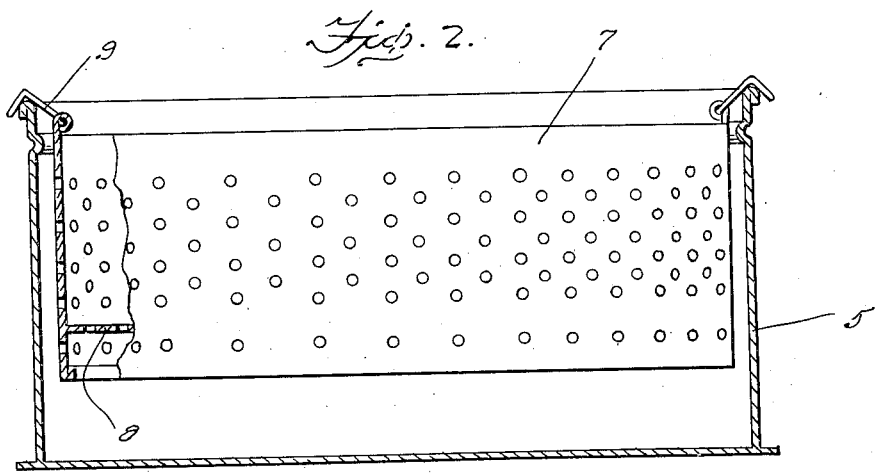
Figure 2 is a sectional view of two receptacles forming part of the invention and arranged one within the other.
Figure 3:
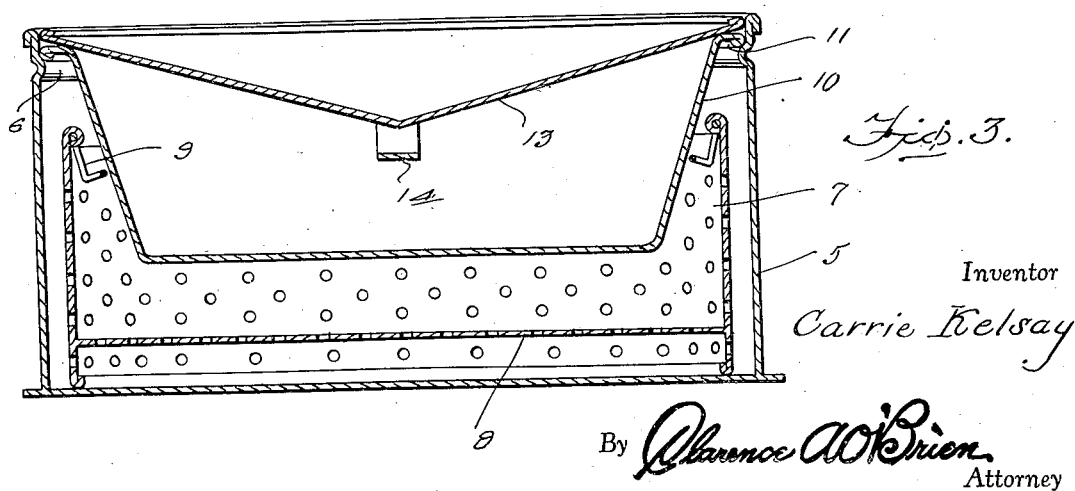
Figure 3 is a sectional view showing three receptacles and a lid illustrating still another use of the invention.
Figure 5:
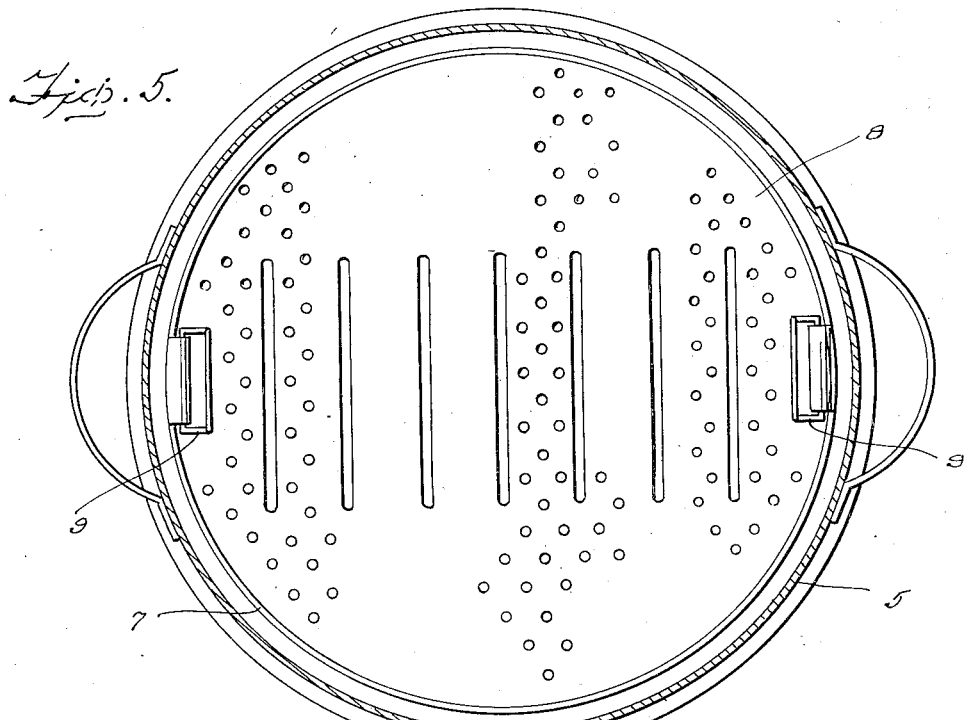
Figure 5 is a detail view taken substantially on the line 5—5 of Figure 4.

The reference numeral 7 indicates a second receptacle the peripheral wall and bottom 8 of which is perforated, said receptacle being formed of metal or other suitable material. As best shown in Figures 2 and 3, the bottom 8 of receptacle 7 is integral or otherwise secured with the peripheral wall 7 and is spaced upwardly from the lower edge of the peripheral wall of the receptacle 7 so that this receptacle may be used as a drainer for the placing of dishes therein after the washing of the dishes to permit the water to drain from the dishes. The receptacle 7 is provided at opposite sides thereof with pivoted combination handles and hooks 9 which latter may be engaged over the upper edge of the walls of the receptacle 5 for suspending the receptacle 7 within the receptacle 5 as suggested in Figure 2. With receptacles 5 and 7 arranged as shown in Figure 2, a suitable dish drainer is provided for scalding and draining dishes.

Figure 4:
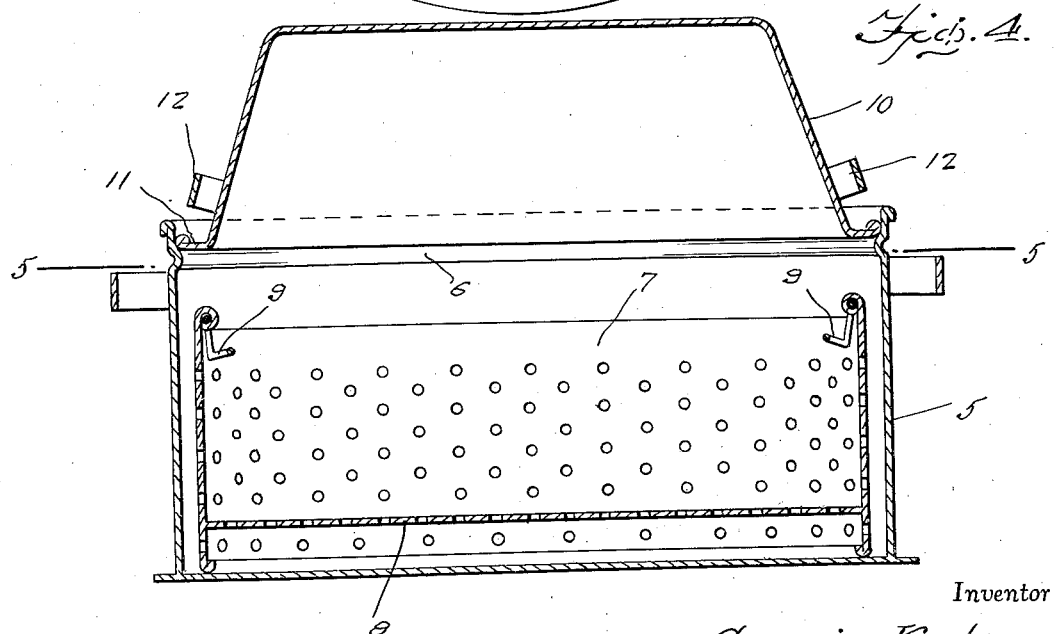
Figure 4 is a vertical sectional view illustrating still another arrangement of the receptacles.

A third receptacle 10 of substantially frusto-conical formation is also provided and has the wall thereof provided with a marginal outstanding flange 11 which may be engaged with the bead 6 of the receptacle 5 in the manner as shown in Figure 3 for suspending the receptacle 10 inwardly of the receptacles 5 and 7 or in any manner shown in Figure 4 to support the receptacle 10 in an inverted position on the receptacle 5. The receptacle 10 is provided also with suitable handles 12.

A substantially shallow conical lid 13 is also provided, and this lid is equipped with a handle 14.

Receptacle 5 may be used independently of the receptacles 7 and 10, and with the cover 13 placed thereon as shown in Figure 1, when said receptacle 5 will serve admirably as a roaster or kettle for cooking or as a bread or cake box.

The receptacle 10 may be used independently as a dish pan for washing dishes. With the receptacle 7 placed within the receptacle 5, and the hooks 9 engaged over the edge of the wall of the receptacle 5 to suspend the receptacle 7 as shown in Figure 2, an efficient dish drainer for scalding and draining the dishes, or a colander for draining juices from fruit in making juice and jelly is provided.

With the receptacles arranged as shown in Figure 4 an efficient steam cooker is provided. Also by removing the receptacle 7 and placing the receptacle 10 within the receptacle 5 so as to extend downwardly and inwardly of the receptacle 5 an efficient double boiler is provided.

When not in use the receptacles and lid may be nested together as shown in Figure 3 so as to require little storage space.

Having thus described the invention, what is claimed as new is:

A kitchen utensil comprising an outer receptacle having a flat bottom and a vertical circular side part, the upper portion of which has an annular internal rib, a second receptacle having a flat bottom, and upwardly and outwardly sloping sides with an outwardly extending flange at the upper edge thereof, said second receptacle being of less depth than the first receptacle with the flange resting on the bead or rib, a substantially conical cover for covering both receptacles, and a perforated tray having means for supporting the same above the bottom of the outer receptacle, said tray being of greater diameter than the lower part of the second receptacle, whereby it may be placed in the first receptacle to rest on the bottom thereof with its upper part surrounding the lower portion of the second receptacle in spaced relation thereto when the second receptacle is placed in the first receptacle.

CARRIE KELSAY.